United States Patent [19]  [11] 4,226,321
Ladin  [45] Oct. 7, 1980

[54] SELF-ALIGNING CLUTCH BEARING ASSEMBLY

[75] Inventor: Eli M. Ladin, Ann Arbor, Mich.

[73] Assignee: Federal-Mogul Corporation, Southfield, Mich.

[21] Appl. No.: 910,386

[22] Filed: May 30, 1978

Related U.S. Application Data

[60] Continuation-in-part of Ser. No. 667,077, Mar. 15, 1977, abandoned, which is a continuation-in-part of Ser. No. 593,627, Jul. 7, 1975, Pat. No. 4,033,440, which is a division of Ser. No. 427,486, Dec. 26, 1973, Pat. No. 3,931,875.

[51] Int. Cl.² ............................................. F16D 13/60
[52] U.S. Cl. ................................................. 192/110 B
[58] Field of Search .............. 192/98, 110 B; 308/233, 308/232, 236; 64/30 E; 267/150, 159

[56] References Cited

U.S. PATENT DOCUMENTS

| | | | |
|---|---|---|---|
| 3,625,327 | 12/1971 | Birdsey | 192/110 B |
| 3,631,954 | 1/1972 | Coaley | 192/98 |
| 3,904,008 | 9/1975 | Sonnerat | 192/98 |
| 3,948,371 | 4/1976 | Lonne | 192/98 |
| 4,026,398 | 5/1977 | Matyschik | 192/98 |

Primary Examiner—George H. Krizmanich
Attorney, Agent, or Firm—Harness, Dickey & Pierce

[57] ABSTRACT

A clutch release bearing is provided with a contact surface and actuation collar in which the center-line of the assembly automatically adjusts to become concentric with the axis of rotation of the contacting clutch release fingers by selective compression of polylobate mounting springs in the bore of the bearing.

9 Claims, 11 Drawing Figures

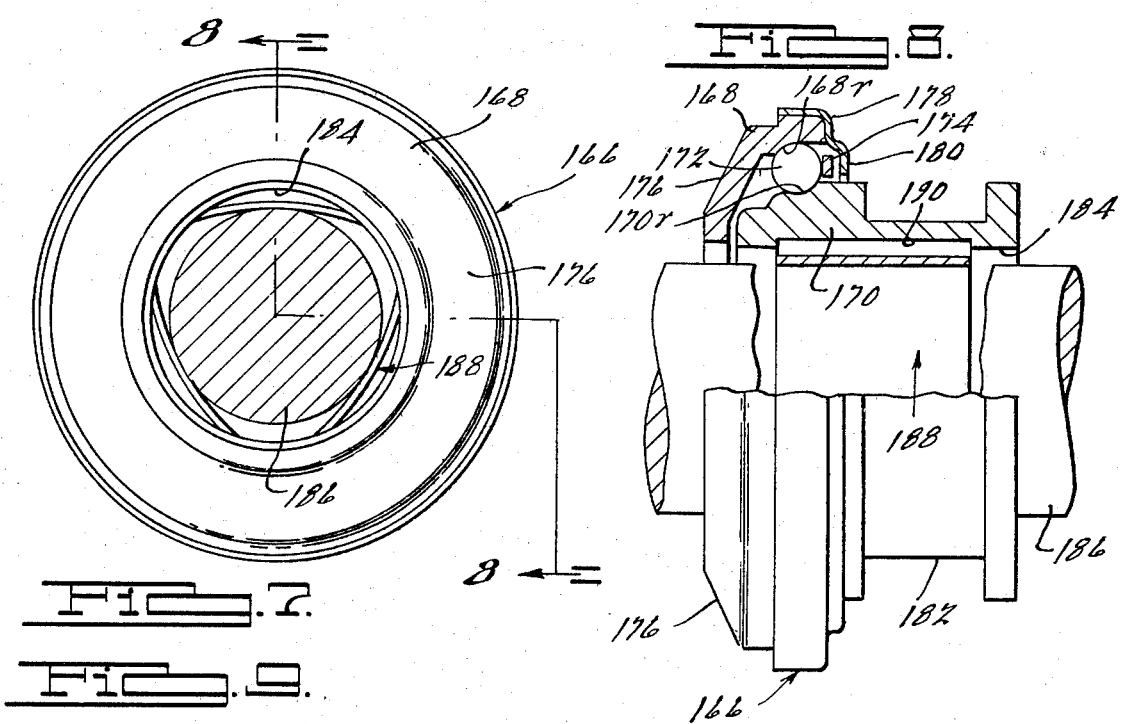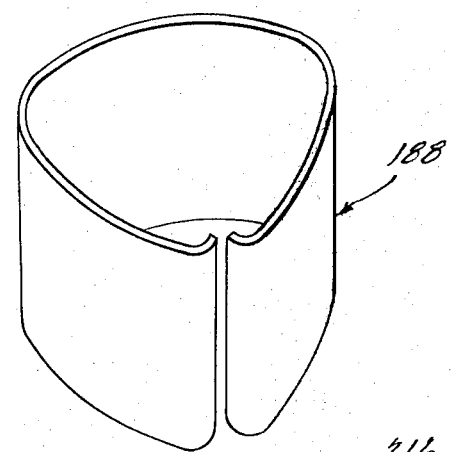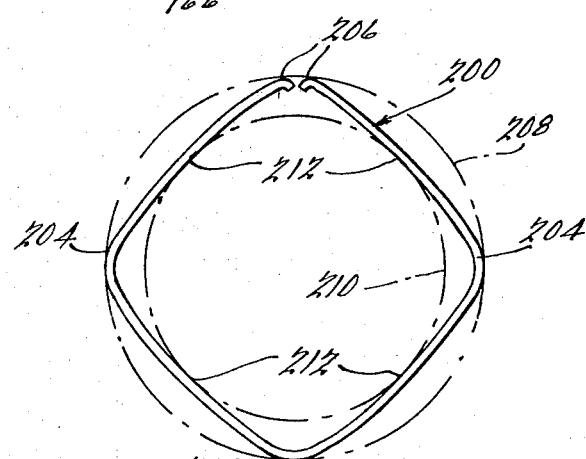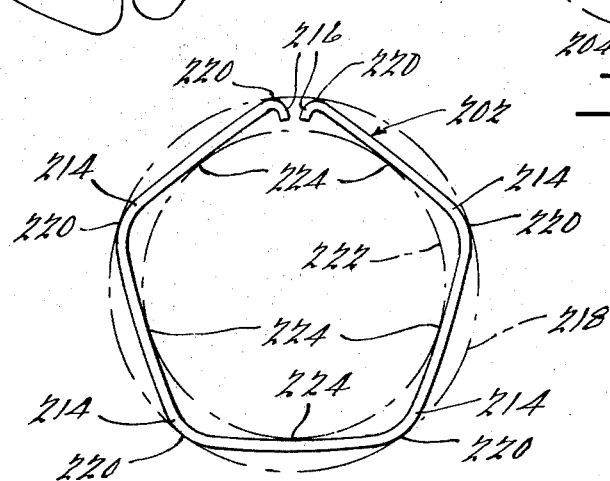

4,226,321

SELF-ALIGNING CLUTCH BEARING ASSEMBLY

CROSS-REFERENCE TO RELATED APPLICATIONS

This application is a continuation-in-part of prior copending application Ser. No. 667,077, filed Mar. 15, 1977, which comprises a continuation-in-part of prior copending application Ser. No. 593,627, filed July 7, 1975, now U.S. Pat. No. 4,033,440, which comprises a divisional application of prior copending application Ser. No. 427,486, filed Dec. 26, 1973, now U.S. Pat. No. 3,931,875.

BACKGROUND OF THE INVENTION

The present invention is directed to bearing assemblies generally, and in particular, to those of the type commonly used as clutch release bearings in automobile friction disc clutches.

Two common problems in the clutch release bearing art are: (1) eccentricity of the bearing axis (transmission input shaft axis) relative to the engine flywheel axis, and (2) an out-of-square condition between the clutch release levers and the bearing. "Out-of-square" is a familiar term used in the art to describe a condition whereby the plane defined by the tip of the clutch release levers or fingers is not parallel to the plane of the bearing face which they engage. The first problem results in undue wear between both the bearing face and the tips of the clutch levers because of the reciprocating motion therebetween which takes place after engagement and prior to the bearing and clutch disc rotating as one unit. The second problem results in undue wear occuring on one particular clutch release lever during one particular clutch release. In other words, the entire axial load exerted while depressing the clutch, which is generally in the order of 500 pounds, is exerted by one clutch finger, or at any rate, less than all clutch fingers, and when this occurs, in an eccentrically mounted bearing assembly, the amount of wear caused by the reciprocating motion between that particular clutch finger and the bearing face is significantly increased over what it would be were it not in the out-of-square condition. These two problems are the result of variations in tolerences arising from currently practiced manufacturing and assembly techniques for the complete clutch and transmissions, and it is not considered economically practical to try to further control these variances.

It has heretofore been proposed to compensate for such misalignment problems by increasing localized loading, introducing bending or over-turning moments, and by allowing oscillatory scrubbing between mating parts of the clutch assembly. These prior art techniques, however, increase the rate of wear, introduce noise and vibration, and generally reduce the life of the clutch assembly.

The clutch release bearing assembly of the present invention overcomes the problems and disadvantages associated with prior art constructions by automatically compensating for deviations in misalignment resulting in improved durability of the clutch assembly and reduced noise and vibration.

SUMMARY OF THE INVENTION

The benefits and advantages of the present invention are achieved by a clutch release bearing assembly comprising a first race member and a second race member having a plurality of antifriction elements constrained therebetween and wherein said first race member includes a radially angled annular surface for contacting the tips of the clutch release levers. The second race member includes an axially extending member adapted to be engaged by an actuating member such as an external clutch fork for effecting axial movement of the bearing assembly during operation of the associated clutch assembly. The second race member and axially extending member are disposed in clearance relationship about a shaft and are formed with at least one internal circumferential groove for receiving a resilient polylobate spring such as a trilobate spring for supporting the clutch release bearing assembly in a spaced and yieldable relationship relative to the supporting shaft extending therethrough.

Additional benefits and advantages of the present invention will become apparent upon a reading of the description of the preferred embodiments taken in conjunction with the accompanying drawings.

BRIEF DESCRIPTION OF THE DRAWINGS

FIG. 7 is a front elevational view of a clutch release bearing constructed in accordance with still another alternative embodiment of the present invention;

FIG. 8 is a side elevational view partly in section of the clutch release bearing assembly shown in FIG. 7, with the section taken along line 8—8 thereof;

FIG. 9 is a perspective view of a trilobate spring employed in the clutch bearing assembly illustrated in FIGS. 7 and 8;

FIG. 10 is an end elevational view of a polylobate spring having four lobes; and FIG. 11 is an end elevational view of a pentalobate spring.

DESCRIPTION OF THE PREFERRED EMBODIMENTS

Figure 1:
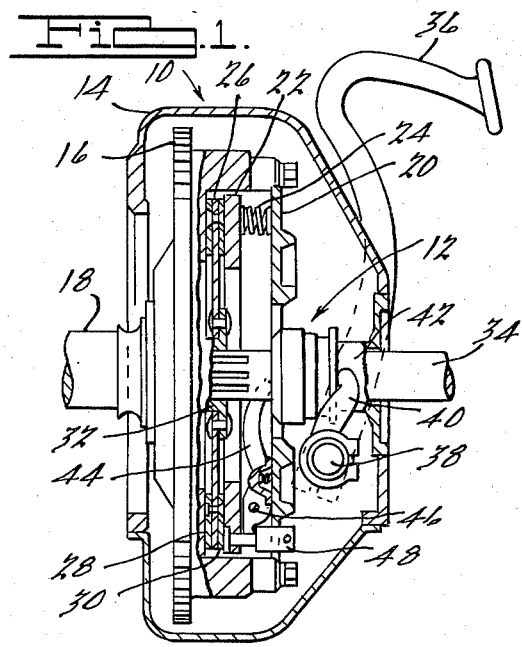
FIG. 1 is a longitudinal sectional view having portions broken away through a conventional automotive type friction disc clutch assembly having a release bearing embodying principles of the present invention.

FIG. 1 is a sectional view of a typical single disc friction clutch 10 having a self-aligning clutch release bearing 12 embodying the principles of the present invention. Briefly, clutch 10 has a housing 14 which encompasses flywheel 16 driven by input shaft 18, typically the engine crankshaft. A backing plate 20 is bolted to flywheel 16 and a pressure plate 22 is urged by a plurality of springs 24 (to the left as viewed in FIG. 1)

to press a clutch disc 26 against flywheel 16. Disc 26 has annular facings 28 and 30 of a friction material on opposite sides thereof. A hub 32 is affixed to the inner periphery of disc 26 and is drivingly coupled via splines with an output or transmission shaft 34. When the clutch is in the engaged position shown in the drawing, flywheel 16, plate 20, 22, disc 26, hub 32 and shaft 34 rotate together when shaft 18 turns. A clutch pedal 36 is pivoted on a stub shaft 38 and an actuating fork 40 is also affixed to shaft 38. When pedal 36 is depressed, fork 40 shifts clutch release bearing 12 to the left as viewed in FIG. 1. Bearing 12 is mounted on a cylindrical sleeve 42 around shaft 34, although it could be mounted on shaft 34 directly if so desired. When bearing 12 is shifted to the left as viewed in FIG. 1, it engages release levers 44 which are pivoted as at 46 on backing plate 20. The opposite ends of levers 44 are arranged to engage bushings 48 which are affixed to pressure plate 22. With the release levers 44 pivoted by bearing 12, pressure plate 22 is shifted to the right as viewed in FIG. 1, thereby releasing disc 26 from the pressure applying relation with flywheel 16. With the exception of bearing 12, clutch 10 is of entirely conventional construction and merely illustrative of the types to which the present invention is applicable.

Figure 2:
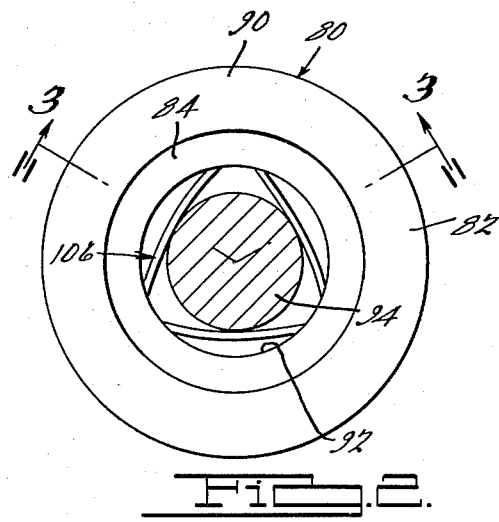
FIG. 2 is a front elevational view of a clutch release bearing constructed in accordance with the present invention.
Figure 3:
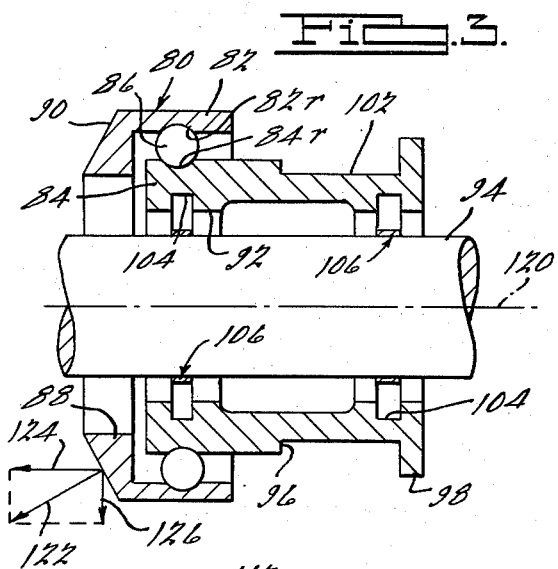
FIG. 3 is a cross sectional view of the bearing assembly shown in FIG. 2 and taken substantially along the line 3—3 thereof.

Referring now in detail to FIGS. 2–5, a clutch release bearing assembly 80 is shown comprising an outer race member 82 formed with a raceway 83r and an inner race member 84 formed with a raceway 84r between which a plurality of spherical antifriction elements 86 are constrained. The forward or left-hand portion of the outer race member 82, as viewed in FIG. 3, is integrally formed with a radial flange 88 defining an oblique annular actuation surface 90 adapted to be positioned in engagement with the ends of the clutch release fingers during actuation of the clutch mechanism.

The inner race member 84 is formed with an integral throughbore 92 of a diameter to provide for clearance from the periphery of a central supporting shaft or transmission shaft 94. The periphery of the inner race member is formed with a radial shoulder 96 intermediate of the ends thereof and an annular radially projecting flange 98 at the rearward or right-hand end thereof, as viewed in FIG. 3, defining an opposing annular surface 100 which in combination with the radial shoulder 96 defines a cylindrical actuation groove 102 in which an actuation mechanism, such as the actuating fork 40 (FIG. 1) is adapted to be disposed for effecting axial movement of the clutch release bearing assembly along the supporting shaft 94.

Figure 4:
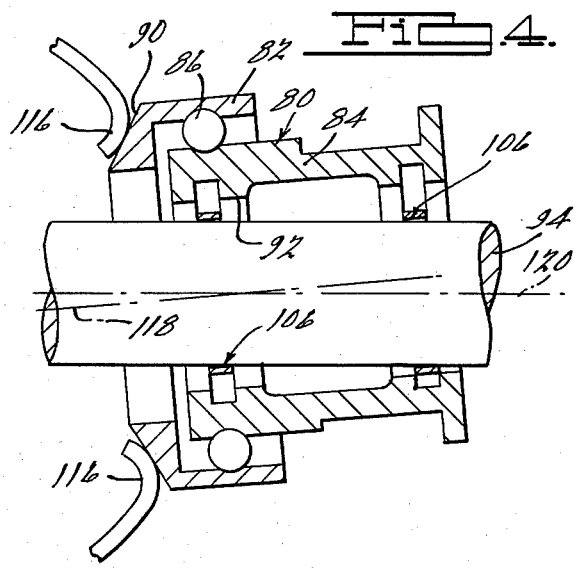
FIG. 4 is a cross section view similar to that shown in FIG. 3 illustrating an exaggerated disposition of the clutch release bearing assembly to provide a self-centering compensation during actuation of the clutch mechanism.
Figure 5:
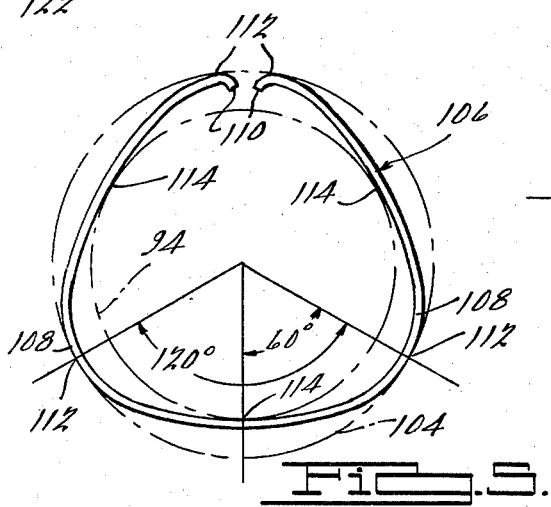
FIG. 5 is a front elevational view of a typical trilobate mounting spring for use in the bearing assembly shown in FIGS. 2–4.

In the specific embodiment shown in FIGS. 2–5, the inner race member 84 is formed with a pair of longitudinally spaced circumferential grooves 104 around the internal bore 92 thereof, in which a pair of resilient elements, such as trilobate springs 106, are disposed in seated engagement. As shown in FIGS. 2, 3 and 5, the arcuate corner portions or lobes 108 of the trilobate spring and the arcuate end portions 110, as indicated in FIG. 5, are adapted to be disposed in seated engagement within the circumferential grooves 104, with the outer periphery of the corner and end portions disposed substantially tangent to the radial inner surface of the grooves at the points indicated at 112 in FIG. 5. The inner surfaces of the arcuate spring sections between the lobes 108 and end portions 110 are disposed in supporting contact with the periphery of the supporting shaft 94 at points of tangent indicated at 114 in FIG. 5, thereby maintaining the clutch release bearing assembly supported in substantially concentric aligned spaced relationship relative to the axis of the supporting shaft.

It will be understood that the trilobate spring 106, as best seen in FIG. 5, constitutes a preferred embodiment in that it provides for positive centering action employing a minimum number of lobes. It has been observed that the fewer number of lobes employed in springs of the foregoing type, the lower is the stress concentration, whereby increased flexure life of the springs is provided. It will be appreciated, however, that lobate-type springs incorporating a greater number of lobes can also be satisfactorily employed in the practice of the present invention.

FIG. 4 is an exaggerated representation, in cross section, of the realigning action provided by the clutch release bearing assembly 80, which is indicative of the magnitude of correction that can be provided without distress. In the position shown, the oblique annular actuation surface 90 is disposed in engagement with the ends of clutch release levers 116, which in the exaggerated misalignment condition illustrated in FIG. 4, are adapted to revolve about a center-line axis 118 which is not coincident with an axis 120 of the supporting shaft 94. Movement of the bearing assembly from a position as shown in FIG. 3, in which its axis is aligned with the axis of the supporting shaft, to a realigned position as shown in FIG. 4, in which its axis is substantially aligned with the axis 118 of the clutch release levers, is accomplished by a resolution of forces represented by the vector diagram shown in FIG. 3, acting against the oblique annular actuation surface 90. As shown, the force of contact represented by the vector 122 is transmitted in a line substantially perpendicular to the oblique actuation surface and comprises the resultant force of an axial vector 124, which is required to overcome the spring load of the clutch pressure plate to effect a disengagement of the clutch mechanism, while radial vector 126 urges the bearing assembly to assume the angular position as shown in FIG. 4 and effects a controlled deflection of the lobate springs.

The resolution of forces as depicted in FIG. 3 acts on the bearing assembly as long as the axes 118 and 120 are not coincident and may be of a duration as long as one-half a revolution of the release levers 116 upon contact of an end of a release lever with the actuation face. At the completion of that rotating movement, the bearing assembly through its self-aligning characteristics assumes the position as depicted in FIG. 4, in which its axis coincides with the axis 118 of the rotating clutch release levers. This self-aligning action is immediate, positive and accurate, and stops only when the radial vector 126 is balanced by an equal and opposite vector as the oblique actuation surface 90 also engages the remaining clutch release levers, whereby a uniform force is applied to each of the actuation levers. Upon a disengagement of the bearing assembly with the ends of the clutch release levers by axial shifting movement to the right as viewed in FIG. 4, the bearing assembly again assumes the centered position as shown in FIG. 3.

While the self-aligning action as hereinabove described in connection with FIG. 4 can also be accomplished employing an annular actuation surface which is disposed in a plane substantially perpendicular to the axis of the bearing similar to the engaging surfaces of the annular wear plates, such self-aligning action is imposed by frictional forces to effect a radial adjustment of the bearing assembly. The reliance on friction alone is conducive to wear and abrasion between the ends of the clutch release levers and the engaging surface, causing wear particles to be produced which enter the bearing assembly and other operative components causing damage thereto. In view of the foregoing, the use of an oblique annular actuation surface in accordance with the preferred embodiment illustrated in FIGS. 2-4 of the drawings provides a wedging action, whereby the resultant radial force imposed eliminates the need for a frictional coupling to effect a centering action and thereby reduces mutual wear and abrasion between contacting parts. The magnitude of the radial force produced employing an oblique annular actuation surface will vary as a function of the angle of the surface relative to the axis of the bearing. It will be understood that in addition to the outwardly tapered oblique actuation surface as shown in FIGS. 3 and 4, the outer race member can be formed with an inwardly tapered oblique actuation surface such as shown in FIG. 6, providing for substantially similar benefits.

Figure 6:
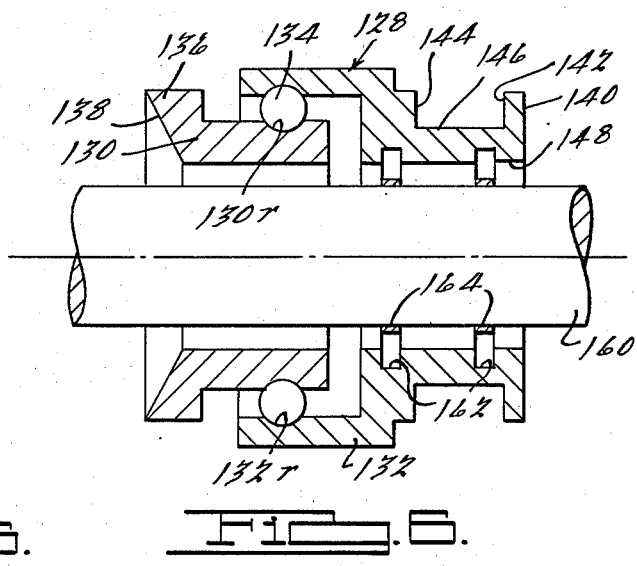
FIG. 6 is a longitudinal vertical sectional view of a clutch release bearing assembly constructed in accordance with an alternative embodiment of the present invention.

Referring now to FIG. 6 of the drawings, a clutch release bearing assembly 128 is shown constructed in accordance with an alternative embodiment to that previously described in connection with FIGS. 2-5. In accordance with the version shown in FIG. 6, the assembly comprises an inner race member 130 formed with an annular raceway 130r and an outer race member 132 formed with an annular raceway 132r, within which a plurality of spherical antifriction bearing elements 134 are constrained. The forward or left-hand portion of the inner race member 130 is integrally formed with a radial flange 136 terminating in an oblique annular actuation surface 138 adapted to contact the ends of the clutch actuation fingers.

The right-hand end of the outer race member, as viewed in FIG. 6, is formed with a radially projecting annular flange 140 defining an annular face 142, which is disposed in axially opposed relationship with respect to an annular shoulder 144 defining therebetween a cylindrical actuation groove 146 adapted to receive an actuation fork lever in a manner as previously described. The outer race member is formed with a throughbore 148 which is disposed in radial clearance relationship with respect to the periphery of a supporting shaft 160. A pair of axially spaced circumferential grooves 162 are formed along the inner bore 148 of the outer race member in which a pair of resilient elements, such as trilobate springs 164, are positioned and engage the periphery of the supporting shaft to maintain the bearing assembly 128 centered relative to the supporting shaft when the clutch mechanism is not being actuated. The clutch bearing assembly 128, as illustrated in FIG. 6, provides certain advantages in some instances over the arrangement previously described in connection with FIGS. 2-5. Such advantages include ease of lubrication of the bearing, reduced rotating speed for the antifriction elements providing for higher maximum permitted rotative speeds, greater load carrying capacity at a given speed and increased bearing life.

Still another alternative satisfactory embodiment of a clutch release bearing 166 is illustrated in FIGS. 7-9 of the drawings. As shown, the clutch release bearing 166 comprises an outer race member 168 having an annular raceway 168r and an inner race member 170 having a raceway 170r between which a plurality of spherical antifriction bearing elements 172 are constrained. The individual bearing elements 172 are maintained in appropriate circumferentially spaced increments by means of a bearing cage retainer 174 of any of the types well known in the art. The outer race member 168 can conveniently be fabricated as a stamping and is formed so as to provide an oblique annular actuation surface 176 which is adapted to be disposed in engagement with the ends of the actuating levers of the clutch mechanism in the manner as previously described. An annular shield 178 overlies the outer race member 168 and is affixed thereto and includes a radially inwardly extending annular portion 180 which terminates adjacent to the periphery of the inner race member 170, serving to retain lubricant in the bearing and to prevent undesired axial movement of the bearing retainer 174.

The inner race member 170 is formed with an actuation groove 182 extending around the periphery thereof in which a clutch actuating fork is adapted to be disposed for moving the bearing assembly axially along a supporting shaft in the same manner and for the same purposes as previously described in connection with the prior embodiment. A throughbore 184 extends axially through the inner race member 170 and is of a diameter greater than that of the periphery of a supporting shaft 186 extending therethrough. An integral trilobate type spring 188 is disposed in a circumferential groove 190 extending inwardly of the surface of the throughbore 184 and serves to resiliently mount the clutch release bearing assembly in axial alignment with the axis of the supporting shaft 186. The tilobate spring 188, as best seen in FIG. 9, is of the same transverse configuration as the trilobate spring shown in FIG. 5, but is of a substantially greater width, obviating the need for employing a plurality of such springs at axially spaced increments along the length of the inner race member. The use of a integral wide trilobate spring provides the same resilience and floating disposition of the clutch release bearing, enabling angular deflection thereof to positions such as shown in FIG. 4 to accomodate eccentricities and misalignments of the axis of the clutch release fingers and the supporting shaft during the actuation of the clutch mechanism.

In the clutch release bearing embodiments as illustrated in FIGS. 2-8, the grooves in the race members in which the trilobate springs are seated are of a depth at least equal to and preferably slightly greater than the thickness of the spring wire so as to provide additional clearance in the event the inner bearing race member contacts the periphery of the supporting shaft. In such event, the trilobate spring still has sufficient flexural space left and does not bottom-out or become directly compressed between the two opposed supporting surface, which otherwise would promote a premature failure of the spring due to the excessive stresses imposed thereon.

It will also be appreciated that in the embodiments shown in FIGS. 2-8 of the drawings, the springs are illustrated as being in direct supporting contact with the periphery of the supporting or transmission input shaft. It will be appreciated that the principles of the present invention are also applicable to those situations in which a splined transmission shaft is employed and includes a retainer tube fixed to the transmission housing and extending axially in enclosing relationship around the splined shaft on which the clutch release bearing is mounted. In such event, the springs contact and support the clutch release bearing around the periphery of the retainer tube.

In the several structural embodiments as illustrated in FIGS. 2-8 of the drawings, the disposition of the inner and outer raceways and spherical antifriction elements are shown as being of the conventional angular contact type. It will be appreciated that these same embodiments may also be of the axial thrust type.

The various embodiments of the clutch release bearing assemblies illustrated in FIGS. 2-8 have been described with particular emphasis on the use of one or a plurality of trilobate springs. As previously mentioned, polylobate springs having a greater number of lobes can also be satisfactorily employed including a four-lobe for quadralobate spring 200 as shown in FIG. 10 and a five-lobe or pentalobate spring 202 as illustrated in FIG. 11. The use of polylobate springs having more than five lobes has been found undesirable in the practice of the present invention because of the reduction in the clearance between the throughbore of the inner race member relative to the periphery of the supporting shaft necessitated by the use of polylobate springs having more than five lobes resulting in a corresponding reduction in the permissible angular deflection of the bearing assembly to correct for a misalignment condition. It will be understood, accordingly, that the term "polylobate" as herein employed is intended to encompass trilobate, quadralobate, and pentalobate springs of which the trilobate form is particularly preferred.

As in the case of the trilobate spring 106 shown in FIG. 5, the quadralobate spring 200 includes arcuate corner portions or lobes 204 and arcuate end portions 206 which are adapted to be disposed in seated engagement within the circumferential grooves formed in the inner bearing race and with the outer periphery of the arcuate lobes and arcuate end portions disposed in seated engagement within the circumferential groove. The base of the circumferential groove shown in phantom in FIG. 10 is indicated at 208. Similarly, the inner surfaces of the arcuate spring sections between the lobes 204 and end portions 206 are disposed in resilient supporting contact with the periphery of a supporting shaft 210 shown in phantom at points of contact indicated at 212 in FIG. 10. The foregoing arrangement maintains the clutch release bearing assembly resiliently supported in substantially concentric aligned spaced relationship relative to the axis of the supporting shaft and permits radial and angular displacement of the bearing assembly to compensate for misalignment conditions.

The pentalobate spring 202 shown in FIG. 11 includes arcuate corner portions or lobes 214 and arcuate end portions 216 which similarly are adapted to be disposed in seated engagement within a circumferential groove or grooves formed within the throughbore of the inner race member and wherein the base of such a groove is indicated in phantom at 218. The arcuate lobes 214 and end portions 216 bear against the base of the groove 218 at the points of contact indicated at 220 in FIG. 11. The inner surfaces of the arcuate spring sections between the lobes 214 and end portions 216 are disposed in supporting contact with the periphery of a supporting shaft indicated in phantom at 222 at tangential points of contact indicated at 224.

Regardless of whether a trilobate, quadralobate or pentalobate spring is employed, the number of polylobate springs, the material of which they are comprised and the cross sectional configuration thereof are controlled within design parameters to provide a substantially infinite life in terms of number of cycles by controlling the major stress and minor stress to which they are subjected during service over the normal operating life of the clutch release bearing. In order to provide a minimum number of cycles of operation for a projected service life of the assembly, the relationship provided in accordance with a Goodman diagram combined with an S-N curve for the particular spring material in question can be employed in accordance with conventional design practice.

While it will be apparent that the invention herein described is well calculated to achieve the benefits and advantages as hereinabove set forth, it will be appreciated that the invention is susceptible to modification, variation and change without departing from the spirit thereof.

What is claimed is:

1. A clutch release bearing assembly comprising a first race member defining a first annular raceway and including means defining an annular engaging surface for contacting external clutch release members, a second race member defining a second annular raceway and including means for engaging actuating means for effecting axial shifting movement of said bearing assembly, a plurality of antifriction bearing elements interposed between said first and said second race member and riding in the annular raceways thereof, said second race member formed with a bore extending axially therethrough for receiving a generally cylindrical support member in a radially spaced clearance relationship defining an annular clearance space therebetween, said bearing assembly adapted to be mounted on the support member and a resilient polylobate spring disposed in encircling relationship within said annular clearance space between said bore and the periphery of the support member for supporting said bearing assembly and said annular engaging surface on the support member in yieldable spaced relationship to permit limited deflection of said engaging surface in a plane perpendicular to and in planes angularly tilted with respect to the axis of said support member.

2. The bearing assembly as defined in claim 1 in which said annular engaging surface is disposed in a radially angled position relative to the axis of said bearing assembly.

3. The bearing assembly as defined in claim 1 further including at least one internal circumferential groove formed along the interior surface of said bore extending axially through said second race member and wherein said polylobate spring is disposed in radial and axial interlocking relationship in said groove.

4. The bearing assembly as defined in claim 3 in which said second race member is formed with a plurality of said circumferential grooves at axially spaced positions along the interior surface of said bore and a polylobate spring disposed in radial and interlocking relationship in each said groove.

5. The bearing assembly as defined in claim 1 in which said first annular raceway and said second annular raceway in combination with said antifriction bearing elements define a ball bearing assembly of the angular contact type.

6. The bearing assembly as defined in claim 1 in which said first annular raceway and said second annular raceway in combination with said antifriction bearing elements define a ball bearing assembly of the axial thrust type.

7. The bearing assembly as defined in claim 1 in which said polylobate spring comprises a trilobate spring.

8. The bearing assembly as defined in claim 1 in which said polylobate spring comprises a quadralobate spring.

9. The bearing assembly as defined in claim 1 in which said polylobate spring comprised a pentalobate spring.

* * * * *